United States Patent [19]

David

[11] Patent Number: 4,833,469

[45] Date of Patent: May 23, 1989

[54] OBSTACLE PROXIMITY DETECTOR FOR MOVING VEHICLES AND METHOD FOR USE THEREOF

[76] Inventor: Constant V. David, 4952 Field St., San Diego, Calif. 92110

[21] Appl. No.: 80,953

[22] Filed: Aug. 3, 1987

[51] Int. Cl.⁴ .............................................. G08G 1/00
[52] U.S. Cl. .................................. 340/901; 340/435; 340/903; 180/169
[58] Field of Search ............. 340/901, 903, 904, 52 H, 340/552, 554, 555, 556, 557; 350/354, 356, 357, 358; 180/167, 169; 342/125

[56] References Cited

U.S. PATENT DOCUMENTS

| | | | |
|---|---|---|---|
| 3,892,483 | 7/1975 | Saufferer | 180/169 |
| 3,898,652 | 8/1975 | Rashid | 180/169 |
| 4,068,951 | 1/1978 | Froome et al. | 342/125 |
| 4,073,359 | 2/1978 | Fujiki et al. | 180/169 |
| 4,240,152 | 12/1980 | Duncan et al. | 340/901 |
| 4,383,238 | 5/1983 | Endo | 340/901 |
| 4,454,512 | 6/1984 | Millett | 342/125 |
| 4,656,484 | 4/1987 | Brown et al. | 343/761 |
| 4,706,195 | 11/1987 | Yoshino et al. | 340/903 |

FOREIGN PATENT DOCUMENTS

| | | | |
|---|---|---|---|
| 3114561 | 12/1982 | Fed. Rep. of Germany | 340/52 H |
| 3138377 | 4/1983 | Fed. Rep. of Germany | 340/52 H |

*Primary Examiner*—Joseph A. Orsino
*Assistant Examiner*—Jill D. Jackson

[57] ABSTRACT

A proximity sensing and indicating system for use in automobiles for instance to provide a warning signal to both the car driver and possibly other drivers that the car so equipped is approaching an obstacle at an unsafe speed and/or is getting too close thereto. The system operation is autonomous and is not monitored by the driver once the system is turned on, it responds only to the presence of an obstacle located ahead of the vehicle. The system detects the differential velocity between the car and the obstacle and determines the distance separating the car from the obstacle which may be fixed or moving in a general direction substantially oriented in the same direction as that followed by the system-equipped vehicle. A signal is generated whenever the combination of differential velocity and separation distance reaches an unsafe level. This signal may be processed so as to emit various types of signals that can be seen, heard and/or be used for taking emergency action such as causing the vehicle brakes to be applied automatically if the driver does not heed the passive signals already emitted. Provisions are built-in to prevent the driver from turning off the system after the emission of a signal has been initiated.

4 Claims, 2 Drawing Sheets

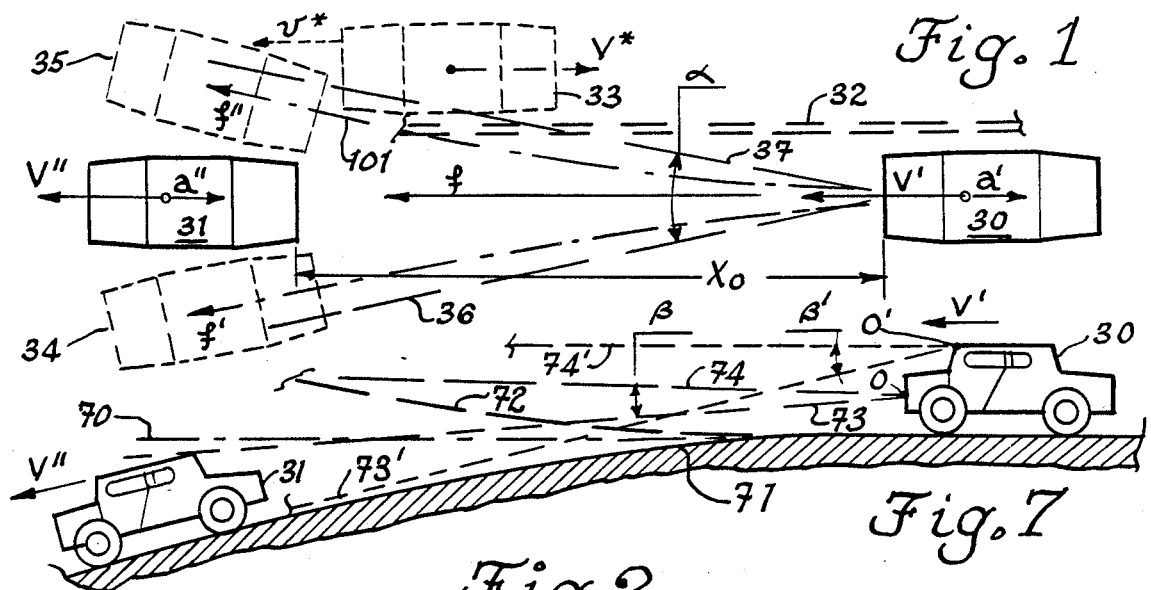
Fig. 1
Fig. 7
Fig. 2
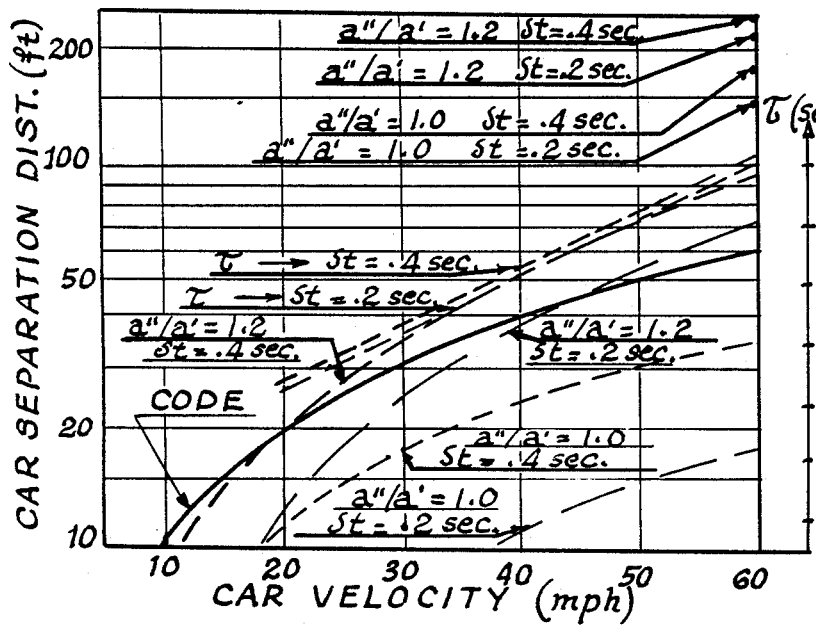
Fig. 3
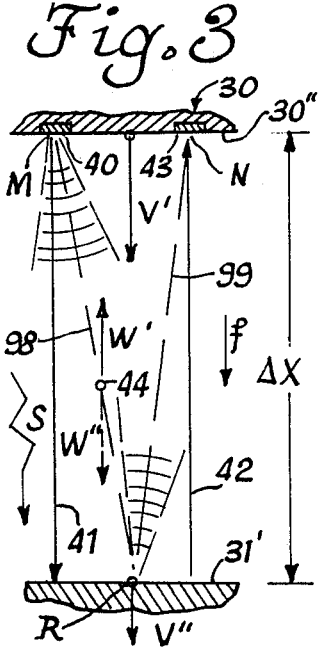
Fig. 4
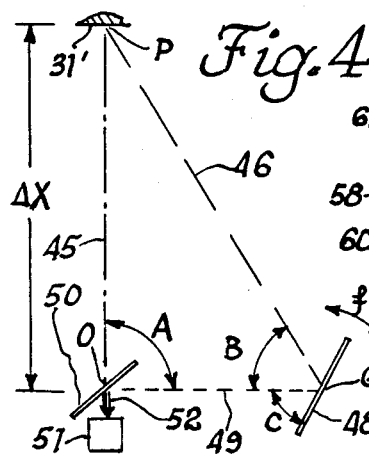
Fig. 5
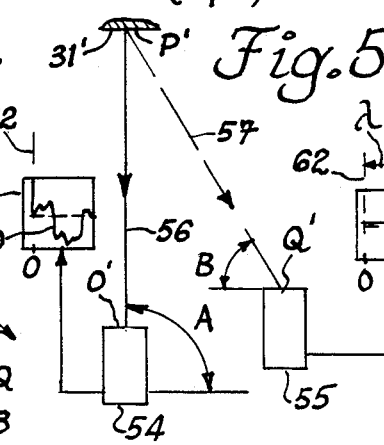
Fig. 6
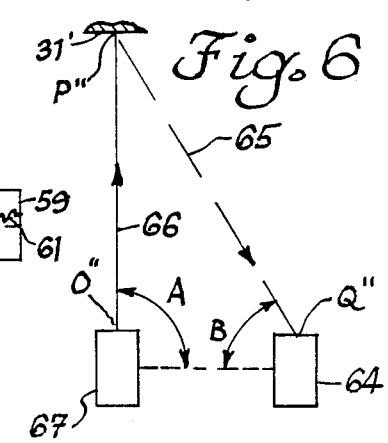

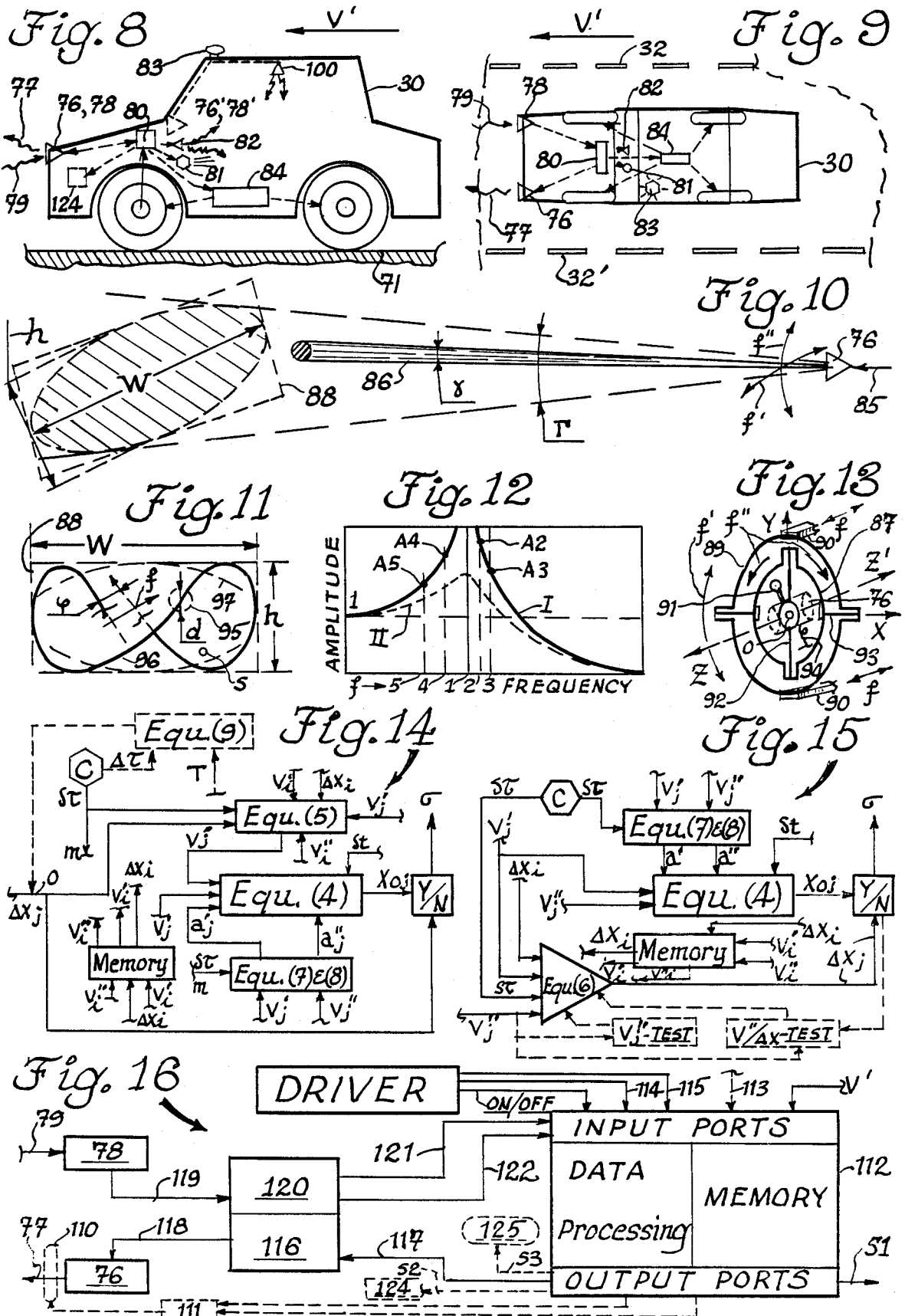

OBSTACLE PROXIMITY DETECTOR FOR MOVING VEHICLES AND METHOD FOR USE THEREOF

BACKGROUND OF THE INVENTION

The present invention relates to a system for use in motorized vehicles to provide a warning signal directed to the attention of the driver of this vehicle and possibly to other drivers in the vicinity of the system-equipped vehicle. The system senses the presence of obstacles located ahead of the vehicle along the general direction in which the vehicle is moving. The obstacle may be another vehicle for instance, either also moving or still. The system detects the differential velocity between the vehicle and the obstacle and determines the distance separating the two. This information is combined with other data such as: (1) vehicle speed, (2) driving conditions, (3) traffic conditions, etc..., so as to enable the system to emit warning signals and/or to take emergency actions in order to prevent a collision between the vehicle and the obstacle.

The number of cars is increasing and highways are getting increasingly congested. Concurrently, the level of stress imposed on the drivers is also increasing. These three factors combine to render driving more and more hazardous, and sometimes deadly. Little can be done to improve the drivers' skill and/or level of attentiveness, or appreciably reduce the stress level. Only non-human supplemental means can be provided to assist the drivers and complement their natural capability regarding attention span and reflexive response times.

It is believed that certain driving and traffic conditions can be better judged and assessed by an automatic system than by the average driver. Also, such systems can react and takes appropriate action quicker than the average driver. Furthermore, it is felt appropriate that other drivers, maybe the police, in the vicinity of the endangering vehicle be notified that a nearby vehicle has become a traffic menace. Preventive measures can then be taken by the drivers or other parties thus warned.

In view of this background, the present invention provides a combination of features and individual construction attributes that are needed to increase the safety of driver/vehicle teams. It is believed that car damages and bodily injuries on highways can be substantially reduced by means of the present invention.

SUMMARY OF THE INVENTION

Accordingly, it is a primary object of the present invention to provide a new and improved system for detecting the presence of an obstacle ahead of a moving motorized vehicle, processing such detection signal and generating a warning signal indicative of the danger of potential collision with such obstacle.

It is another object of the present invention to provide the danger indication given by the warning signal in visual and audible display forms for easy perception and identification.

It is another object of the present invention to provide a system that causes the operation of the vehicle to be beneficially affected, i.e. idling the engine and/or applying the brakes automatically, without driver's intervention and faster than the driver's reaction would permit if an emergency situation arises.

It is another object of the present invention to provide a system that displays the warning signal in a manner which can be perceived and interpreted by other close-by drivers to enable them to take appropriate corrective and/or preventive actions.

It is another object of the present invention to provide a system that may be turned on and off by the driver, but only if the system has not already been activated by the presence of an already detected obstacle.

It is another object of the present invention to provide a system that only detects the presence of obstacles located on or about the path which is about to be followed by the vehicle.

It is still another object of the present invention to provide a system that responds solely to traffic and vehicle operating conditions, independently of the driver's actions.

DESCRIPTION OF THE DRAWINGS

FIG. 1 is a plan schematic diagram of two cars on a road in close proximity, the back car being equipped with the system.

FIG. 2 is a time/distance/velocity graph on which safe driving characteristic curves are shown.

FIG. 3 is a schematic of a detection system based on the use of doppler effect.

FIG. 4 is a schematic of a detection system based on the use of image-superimposing principle of range finding.

FIG. 5 is a schematic of a detection system based on the use of imaging delay measurement.

FIG. 6 is a schematic of a detection system based on the use of geometric triangulation.

FIG. 7 is an elevation schematic diagram of two cars shown following each other on a road and in close proximity, the second car being equipped with the invention system.

FIG. 8 is an elevation schematic drawing of a car equipped with the invention system showing diagrammatically the location of the system components in and on the car.

FIG. 9 is a plan schematic drawing of a car equipped with the invention system and shown riding in the middle of its lane.

FIG. 10 is a perspective diagram of the solid angle within which an outgoing signal beam of the system must be located and should cover.

FIG. 11 is a graphic representation of Lissajous' curves used to represent a type of seeking-beam sweep.

FIG. 12 is a graphic illustration of resonance curves indicating a typical relationship between amplitude response and frequency tuning.

FIG. 13 is a schematic diagram of a two-torsion-spring gimballed device used for generating a Lissajous-curve pattern.

FIG. 14 is a flow chart showing the data processing method used in conjunction with separation-distance sensing.

FIG. 15 is a flow chart showing the data processing method used in conjunction with velocity sensing.

FIG. 16 is a block diagram illustrating the invention system overall operation.

DETAILED DESCRIPTION OF THE INVENTION

The usage mode of the proximity sensing and warning system of the present invention is illustrated in FIG. 1 where two cars 30 and 31 are shown following each other in close proximity in the lane of a highway identified by one lane boundary 32. Car 30 is shown moving straight in the direction of arrow f at a velocity V' and closing in on car 31 moving at a velocity V" lower than V' in the present case. A car 33 moving at velocity V* in opposite direction in an adjacent lane is depicted for later reference. If the highway makes a curve, left or right, car 31 may deviate from the direct line of sight of car 30 (direction f) and may then assume the positions indicated by outlines 34 and 35 that are proceeding in the directions of arrows f' and f", respectively. If car 31 is to be detectable for any curvature of the highway, the line of sight of car 30 should cover an angle $\alpha$ in the worst instance. Boundary lines 36 and 37 represent the angular limits within which angle $\alpha$ of the line of sight is confined. Car 33 is shown being located outside angle $\alpha$.

In FIG. 2, the distance Xo of FIG. 1 separating car 30 front end from car 31 back end is plotted as a function of car 30 velocity. The various curves shown are identified in the graph and in the next section. Their significance is also discussed therein.

FIG. 3 to 6 illustrate various principles used in the detection and sensing of the presence of an obstacle located ahead of car 30, such an obstacle being the back end 31' of car 31 for example. FIG. 3 depicts the operation of a DOPPLER detector utilizing sound waves as signal carriers. A sound emitter 40 located on car 30 front end sends sound wave 41 that hits the reflective surface of back end 31' of car 31. A fraction of sound wave 41 is reflected back toward car 30 and is identified as sound wave 42 that is sensed by receiver 43 also mounted on car 30 front end. The wave transmission medium 44 is air and may have a velocity component W' or W" in the motion direction of both cars. The DOPPLER effect produced by velocities V', V" and W' (or W") on the sound frequency is used to determine velocity V", in the manner described and discussed in the next section.

FIG. 4 to 6 pertain to methods of sensing separating distance Xo. FIG. 4 depicts the principle used in rangefinders in which distance is measured by triangulation, as is well known. To that effect, light rays emitted by surface 31' travel along two preferential directions 45 and 46, carrying the image of surface 31'. Beam rays 46 strike a mirror 48 and are reflected as rays 49. At the same time, beam rays 45 carrying the same image strike halfsilvered mirror 50. The two carried images then combine to be detected by image sensor 51 when exposed to double beam 52. Mirror 50 has a fixed angular position, whereas mirror 48 is enabled to rotate in arrow f direction. The relative positions of points 0, P and Q determine angles A and B, distance 0-P being fixed. Assuming that A remains a right angle, angle B then directly and singularly becomes a measure of distance 0-P (Xo). The operation of image sensor 51 and the angular actuation of mirror 48 are described and discussed in the next section as they apply to the present invention.

The triangulation principle used in the system shown in FIG. 5 is somewhat different. ngle A is fixed and angle B varies, but not on account of any position adjustment in the system, only as a result of position variations of point P'. Such position variations are sensed by fixed CCD (charge-coupled device) elements 54 and 55. Light rays 56 and 57 emitted by point P' strike CCD's 56 and 57 simultaneously but with a parallax off-set. The amount of this off-set $\lambda$ is a measure of the value of angle B, hence of the distance separating point P' from both points 0' and Q' (Xo). The operation of the CCD's is described and discussed in detail in the next section. Suffice it to mention at this junction that the image off-set manifests itself on the equivalent of oscilloscope screens 58 or 59 in the form of single waveform curves such as 60 and 61. From a reference origin O (vertical line 62), the off-set amount $\lambda$ between the two curves 60 and 61 is representative of what CCD's 54 and 55 sensed:two identical waveforms relatively displaced by the amount $\lambda\lambda$ is a measure of the amount of parallax, thus of distance Xo. Electronic circuits are used to determine the extent by which the two waveforms must be shifted to coincide, thus giving a signal indicative of the value of Xo.

In FIG. 6, the triangulation method of measuring distance is also used. Angle B is directly measured by CCD 64 that receives the light ray reflected at point P" by surface 31'. Surface 31' is struck by a light ray 66 emitted by light source 67. Both CCD 64 and light source 67 are fixedly mounted on the front end of car 30. The light used is typically infra-red. CCD 64 is capable of sensing the incidence angle of light rays 65. The signal thus generated is processed so as to determine Xo. This type of distance-measuring devices is currently used in some low-cost autofocusing cameras, in which infra-red signalling light is used.

FIG. 7 illustrates a side view of the relative positions that cars 30 and 31 may assume, depending on grade variations of the road. The road bed may be level (line 70), turning downhill (line 71) or uphill (line 72) ahead of car 30. In either case, car 31 leaves the line of sight of car 30 if both boundary lines 73 and 74 limit the vertical component value $\beta$ of the sighting solid angle unrealistically. The horizontal component value $\alpha$ of the sighting solid angle is shown in FIG. 1. These two angle components and their importance are further described in FIG. 10 and discussed in the next section.

The schematic elevation view of FIG. 8 illustrates an examplary arrangement of the present invention system installed on car 30. In its most complete embodiment, the system comprises signal emitter 76 and signal receiver 78, emitting and receiving signals 77 and 79 respectively, central processing unit (CPU) 80, warning light 81 and buzzer 82, both located inside car 30, warning light 83 mounted outside car 30 and emergency brake actuating system 84 connected to car 30 brakes. The various lines connecting these components are shown in dotted lines for easy identification. In FIG. 9, car 30 is shown viewed from above so as to further facilitate recognition of these components, especially signal emitter 76 and receiver 78. For better protection from environmental conditions, both could be located inside car 30, as indicated by phantom outline 76',78' in FIG. 8. Car 30 lane is defined by lane boundary lines 32 and 32'.

FIG. 10 shows diagrammatically how a differentiation could be made between sighting solid angle $\tau$ and the much smaller solid angle $\gamma$ that characterizes emitted signal beam 77. The rationale for such differentiation is discussed in the next section. Suffice it to indicate that height h and width W of any transversal section of sighting solid angle $\tau$ correspond to angles $\beta$ and $\alpha$ of FIG. 7 and 1, respectively. Signal emitter 76 receives signal 85 from the CPU and emits signal beam 86. Emitter 76 is caused to move angularly along the directions of arrows f and f' simultaneously. Proper adjustments of both the amplitudes and frequencies of these two angular vibrations result in a sweep by beam 86 of the area S of the sighting solid cone section defined by h and W. As discussed in the next section, such sweeping action may be advantageously exploited for signals of a certain nature.

The diagrammatic and schematic drawings of FIG. 11 to 13 illustrate how two orthogonally oriented vibrations may be combined to cause beam 86 of FIG. 10 to sweep the whole area of rectangle 88 automatically. To that effect beam emitter 76 is mounted at the center 0 of a gimballed arrangement consisting of two concentric circular rings 87 and 89. Outer ring 89 is attached to structure 90 and inner ring 87 supports emitter 76 body. The latter is equipped with a ballast 91 located in one of the four quadrants formed by the axes of rotation of the two rings. At rest, the rings are located in the same plane defined by axes X and Y, perpendicular to the car longitudinal axis. Ballast 91 is also located in the X-Y plane and its mass is small compared to that of emitter 76 body. Structure 90 is actuated to move along axis Z-Z' parallel to car 30 longitudinal axis and perpendicular to plane X-Y. The rings and the beam emitter body are connected by torsion spring pairs 92 and 93, oriented at right angle as shown in FIG. 13. The vibrating actuation of structure 90 in arrows f direction causes ballast 91 on account of its inertia to exert two torques orthogonally oriented and resisted by the pairs of torsion springs. Plane X-Y thus appears subjected to a wobbling motion about center 0 when structure 90 is vibrated.

The exciting vibration imposed on structure 90 is of fixed, but small amplitude, and may have a fixed or an adjustable frequency. The oscillations of rings 87 and 89 are only very slightly damped. Thus, emitter body 76 is free to enter into a resonating vibration mode if the total masses of the emitter, ballast and/or ring 87, as applicable, and the torsional rigidities of springs 92 and 93 are are properly matched, so as to exhibit response frequencies that are close to that of the forcing vibration. The two modes of resonating vibrations are of course about axes OX and OY. FIG. 12 indicates how the amplitude of a vibrating mass typically varies in response to a forcing vibration of frequency f-1 as a function of both the natural frequency f-2, f-3, f-4 or f-5 of the excited mass/spring system and as a function of the degree of damping. Curve I corresponds to little damping and curve II corresponds to a much higher degree of damping, although still lower than critical. Thus, if the mass of emitter body 76, ballast 91 and ring 87 (as applicable) is given the full degree of freedom that springs 92 and 93 allow, that mass will be urged to respond in the form of two vibrating torsional motions about axes 0-X and 0-Y. The adjustment of the natural frequency of each vibrating mass, as compared to the forcing frequency, determines the amplitude such as A2, A3, A4 or A5 which then characterizes the mass vibration. The forcing vibration amplitude is assumed to be unity. Electrical lead 94 supplying power to emitter 76 can be made flexible enough so as to be render its influence on damping negligible. It is worth noting that the response amplitudes can be made much larger than the exciting amplitude.

It should be mentioned that varying the frequency f-1 of the forcing vibration corresponds, in FIG. 12, to displacing the vertical lines indicative of the various frequencies f-2, f-3, etc.. that determine A2, A3, etc.. values. Thus one sees how one single adjustment of the forcing vibration frequency allows the dual simultaneous adjustment of the amplitude ratio of the response vibrations. The significance of this feature is illustrated in the graphic representation of FIG. 11. If beam 86 emerging from emitter 76 hits a screen 88 oriented substantially perpendicularly to the beam general orientation, it forms a light spot 95 on that screen. The dual oscillating motions of beam 86 combine to cause spot 95 to follow an ever changing pattern of curves such as 96. These patterns are known as Lissajous curves, one simple example being curve 97 that is an ellipse when the two response frequencies are equal, though the associated amplitudes are different.

If the frequencies of the two responding vibrations have no harmonic components, curves 96 do not form a stable pattern such as that of curve 97 but "out-of-phase" patterns typified by phase shift $\phi$ which corresponds to the right end of curve 96 shifting in arrow f direction with respect to curve 96 left end. It is evidence that the frequencies f' and f'' of the two response vibrations can be adjusted for a given exciting frequency f* to insure that $\phi < d$ (diameter of spot 95). The amplitude ratio of the two vibrations can be concomitantly adjusted to the equal to the ratio h/W. Any and all points of rectangular area hxW is thus assured to be struck by spot 95 at time intervals of frequency considerably lower than either one of frequencies f' and f''. The application of this automatic sweep embodiment to the present invention if further discussed in the next section.

FIG. 14 and 15 present two flow chart diagrams that correspond to two basic obstacle-sensing approaches, by means of distance measuring and velocity measuring, respectively. The charts indicate the manner by which the sensed and measured data is processed by a central processing unit (CPU) programmed to handle such data by means of algorithms derived and described in the following section. Time clock C defines the sequence and duration of the time steps $\delta\tau$ used in the step integration of velocities and/or in the step differentiation of displacements. In both instances, the instantaneous distance separating cars 30 and 31 is compared to a calculated "safe" separation distance that varies as a function of operational parameters also defined in the next section. The result of this comparison is either positive or negative. If the driving condition of car 30 is deemed safe, signal $\tau$ is not generated. If the driving condition of car 30 is deemed unsafe, signal $\tau$ is generated so as to activate a warning system.

FIG. 16 summarizes the system of the present invention in the form of a block diagram. Velocity V' of car 30 is always known and indicated by the car speedometer. The signal lines corresponding to the use of a distance sensing system are shown in solid lines. The signal lines corresponding to the use of a velocity sensing system are shown in dotted lines. The block diagram is of a general nature and does not differentiate between the type and nature of sensing signal, i.e. light, sound, radar, etc... Direct measurement of car 31 speed is assumed to be performed by means of a DOPPLER system. Further discussion of the block diagram is presented in the next section.

OPERATION AND DISCUSSION

Very often, consciously or not, car drivers on streets, roads, highways and freeways ignore the rules of safe driving, and get too close to the vehicle ahead. The situation gets worse in heavy traffic congestions and during rush hours. This results in chainreaction multiple accidents referred to as car pile-ups. Such occurrences are common and are very costly in terms of losses of lives, damages and traffic flow interruptions. The safe driving rule regarding distance separation between two cars is ignored both because it is impossible to adequately estimate that distance and seems unconsciously too conservative to most drivers. Advances in the field of electronics have rendered such estimation practically possible in a manner that can be objective, adaptable to instantaneous existing conditions and precise without assistance from the driver, at a reasonable cost. The driver can be warned that he (she) has caused the driving to become dangerous. The outside world, i.e. policy and/or other drivers, may also be warned that a specific car has become a traffic danger. Finally, steps may be taken by the system to correct the situation automatically and by-pass the driver. A study of such problems is first required so as to formulate its scope, parameters and solutions.

Problem Definition

Referring to FIG. 1, the parameters that will affect the probability of a rear-end collision between cars 30 and 31, in the event that car 31 decelerates brusquely, are: (1) the separation distance Xo between the two cars at time zero when car 31 is caused to decelerate (e.g. brakes being applied), (2) velocity V' of car 30 at t=0, (3) velocity V" of car 31 at t=0, (4) time delay $\delta t$ that elapses between t=0 and the time at which car 30 reacts and starts decelerating, (5) the deceleration a' of which car 30 is capable of, and (6) the deceleration a" of which car 31 is capable of. Simplifying assumptions may be made in the worst but simplest case where: (1) the deceleration levels remain at their peak values and constant until car 30 stops, (2) the drivers remain in control of their respective vehicles, (3) original separation distance Xo is deemed safe if car 30 stops without making contact with car 31, (4) the car motions proceed in straight lines, and (5) the road bed is level or the influence of grades is ignored. As a function of time t, car 30 moves a distance X' and car 31 moves a distance X". The variable instantaneous distance separating the two cars is $\Delta X$. Thus, if and when V'=0 when $\Delta X \geq 0$ at time $\tau$, the original separation distance Xo was safe and is deemed adequate. The equations describing the car motions are:

$$X' = V't - a'(t - \delta t)^2/2 \quad (1)$$

for car 30

$$X'' = Xo + V''t - a''t^2/2 \quad (2)$$

for car 31.

$\Delta X = X'' - X'$ and is assumed to be at worst 0 at time $\tau$, which yields the minimum acceptable and marginally safe value of Xo as a function of all other parameters. Combining the above equations and rearranging the terms yields:

$$Xo = (V' - V'' + a'\delta t)\tau + (a'' - a')\tau^2/2 \text{ (tm)} \quad (3)$$

$\tau$ is equal to $(V'/a' + \delta t)$ if V' here is car 30 original velocity at time zero. Replacing $\tau$ by its value in equation (3) and rearranging the terms yield the final equation that relates all above-defined and known or adjustable parameters:

$$Xo = V'^2(1 + a''/a')/2a' + (V' - V'' + V'a''/a')\delta t - V'V''/a' \quad (4)$$

In the ideal case where V'=V" and a'=a", equation (4) simplifies down to $Xo = V'\delta t$, which is what is intuitively known.

The California Vehicle Code indicates that cars should leave a distance of one car-length between cars moving at the same velocity for each 10-mph of car speed. For an american car length of 14–15 ft, this criterion corresponds to 1 sec. for $\delta t$, which is too long and unrealistic, but which makes allowance for other conditions that may differ between the two cars, e.g. their ability to decelerate and stay under control. Because of those reasons, this rule of thumb is generally ignored in heavy traffic. The reaction time of an average car/driver combination is about a half-second, i.e. sum of driver reflex time and delay time for full braking to become effectively applied to the car. This sum is referred above as $\delta t$. This factor is usually underestimated and contributes to most "tail-gating" actions that many drivers feel is safe for them to take, often with disastrous results.

For easy comparison and reference, a graphic way is used in FIG. 2 for representing the safe driving CODE rule and information provided by equation (4). Two parameters were varied a"/a' and $\delta t$. Xo and $\tau$ are plotted as a function of V' for selected combinations of these two parameters. Also, for an original V' value of 60 mph, an original value of 40 mph was used for V" and also used for all four combinations of the two parameters above so as to determine the importance of V'−V" at t=0 (influence of closing in). For ease of representation, a logarithmic scale is used for Xo (CAR SEPARATION DIST.) and linear scales are used for $\tau$ and V' (CAR VELOCITY). All curves are identified by the values of the parameters. The curve in solid line identified as CODE bends downward as V' augments because of the influence of the semi-logarithmic scale plot. For all points of the curves shown in dotted and phantom lines, the original values of V' and V" were assumed to be the same. For one case in which V'=60 mph, the assumed original value of V" is 40-mph, as mentioned above. The results are shown in FIG. 2 and identified by means of large dots.

Results of most interest here are briefly discussed below as they will later help determine the system characteristics. First and foremost, the CODE curve happens to fall between the two curves a"/a'=1.2, $\delta t$=0.4 sec. and a"/a'=1.0, $\delta t$=0.2 sec. in the range of 20- to 50-mph for V' at t=0. Second, for values of original V" lower than those of V' (by 20-mph in the example given above), the safe minimum value of Xo must almost double, everything else remaining the same. The closing-in effect is of paramount importance, and it is the most difficult factor to assess correctly for most drivers. Third, although the response time $\tau t$ is a small fraction of $\tau$ at high values of V', it corresponds to a sizable portion of Xo, which explains again why underestimation of reflex time is so dangerous. Four, the most ignored factor is the car/pavement conditions and the resulting ability to decelerate and stop, though this factor proves to have a large influence on Xo at higher original velocity values.

In the calculations, an average car-30 condition was assumed and a value of 15-ft/sec² was used for a'. Decelerations are handled as negative accelerations as shown by the sign conventions used in equations (1) to (4). This typical value of a' is derived from a second rule of thumb given in the California Vehicle Code, i.e. a car moving at 20 mph should be able to stop within a 25-ft distance. This represents a deceleration level slightly higher than g/2 (g=gravity constant=32.2 ft/sec$^2$). Thus, a value of 15 ft/sec$^2$ for a' is conservative and corresponds to an ability to stop slightly below average. A constant value of a' was used and the high value of a", i.e. for a'/a'=1.2, corresponds to a deceleration level slightly higher than average (18 ft/sec$^2$). As can be noted from the results shown in FIG. 2, this small difference in car brake conditions can make a large difference in the value of Xo that is needed to prevent rear-end collisions.

Three main conclusions can be derived from the cursory study reported above: (1) the rule-thumb guidelines stated in the Vehicle Code are generally valid for standard car and/or road conditions, (2) that are grossly invalid for conditions departing only slightly from standard, and (3) adjustments in Xo values which reflect such departures from standard would be very valuable.

Warning Signal Displaying

As stated in the previous section, two classes of people need to know if and when a car has become a traffic hazard: (1) those in the car itself, i.e. the driver and possibly the passengers therein, and (2) those in the vicinity of the car that is endangering them, i.e. other drivers and possibly police cars next by. Thus it is believed that two locations on the car need be considered: (1) one outside the car, and (2) one inside the car. They are referred to henceforth as external and internal respectively.

External Warning Display

This is the simplest and most controversial warning, but that may prove most effective in preventing car pile-ups. It is evident that drivers would object to advertising their unsafe driving, especially to the police, however it would be the most effective way to eliminate tailgating. To a lesser degree, drivers will also object to signalling to other drivers the hazard that they have created. However, the thus-warned drivers are in a position to take preventing actions and/or to avoid taking chances in the vicinity of the suspicious car. In all instances above, a beneficial safer driving atmosphere will eventually result.

A small bright flashing light should be located on or near the top surface of the car roof at a point high enough to emit a signal that is visible in all directions. The light color should be different from those which already visually "pollute" streets and highways, for easy recognition and identification. For instance blue could be of interest. Flashing might add to the message conveyed in terms of urgency and attention getting. Sounds of any nature are not advisable here.

Internal Warning Display

This display must not fail to attract the driver's attention and/or that of his passengers. As indicated in FIG. 8 and 9, two types of signal can be used concurrently and simultaneously: visual and audio. In addition to drawing attention, one signal may be intended to create a state of annoyance such as modulated buzzing, so that the driver is enticed to take immediate corrective actions. The locations of the two signal sources deemed best for optimum effectiveness are: the dashboard for the visual signal and the car ceiling for the audio signal. An alternate location for the audio signal source is so shown in FIG. 8, as an example of optimum placement, i.e. directly above the driver's head. The volume of such audio signal could be caused to augment with time and should not be too loud initially to avoid scaring the driver.

Signal Data Processing

As described in the previous section, three types of signals must generally be handled by the proximity warning system: (1) a signal type for warning purpose as just discussed, (2) a signal type for locating obstacles ahead of the car, and (3) a signal type for indicating the distance and/or velocity of that obstacle. Regardless of the nature of the last two signal types, the information they carry must be processed so as to determine whether the initial separation distance Xo is adequate or too small. Equation (4) earlier derived indicates how Xo can be calculated when various parameters affecting the spatial relationship between two contiguous cars are known, regardless of the way this information is obtained. In the most general case, the following data is easily accessible or known: (1) car-30 velocity (speedometer) or V', (2) a"/a' if pavement conditions are assumed to be the same for both cars, (3) a' if car-30 driver knows the condition of his (her) car brakes and tires, and (4) δt if the driver is realistically cognizant of his (her) driving ability and car general condition. Thus (1) is directly measured and known at all times. (2) and (3) can be supplied by the driver and inputed into the data processing system. (4) must be supplied by the driver and also inputed into the data processing system. If (2), (3) and/or (4) are not inputed by the driver, conservative default values are assumed by the CPU and retrieved from the memory.

In the equation derivation process, for simplicity sake, the decelerations a' and a" are assumed to remain constant at their peak levels. If they are not, deviations between assumed and actual values will be factored in by cars 30 and 31 responses in the form of the instantaneous values of V', V" and ΔX. However, for safety reasons, the initial values of a' and a" remain fixed at the values assumed at the start of any sensing-and-warning cycle of the system, unless adjusted before a warning signal has been originated. The simplest and most general case of separationdistance (ΔX) sensing only is discussed first.

Continuously, ΔX is measured by a distance-measuring device of any of the types described in the previous section. Such device generates a signal representative of ΔX value. Several times a second, this value is compared to the value of Xo that is concomitantly calculated using equation (4). If ΔX is larger than Xo, no warning signal is generated. However, when ΔX—Xo reaches a negative value, warning signals are generated. In equation (4), V" is not known and must be obtained indirectly, if it is not measured. It is simply done by time differentiation of ΔX, since V' is known, as follows.

Assuming that the time intervals between calculation cycles or steps are constant and equal to δτ, at any time the following relationship between ΔX, V', δτ and V" holds true:

$$V'' = V' + (\Delta X_j - \Delta X_i)\delta\tau + V' - V' \qquad (5)$$

in which the subscripts i and j refer to immediate past step and present calculation step. $V'_j$ and $V'_i$ are measured, thus known. $\Delta X_j$ and $\Delta X_i$ are known from past and present direct measurements. δτ is a constant known time step. The calculated value V" can then be used in equation (4) to calculate Xo at time $\tau$. At the end of each calculation step, $\Delta X_j - Xo$ is then calculated.

Another simple but possibly less accurate method would be to measure V" directly only by means of a DOPPLER system (FIG. 3) for instance and to calculate $\Delta X$, using a step integration method. In this case, V' and V" are known, the former by direct measurement (speedometer), the latter by means of the DOPPLER system. However, integration requires a starting point or an initial value of $\Delta X$. It may be assumed that a distance sensing device operates continuously, for instance every half second. When the separation distance Xo so measured reaches a value equal to or lower than 15 V' for example, the DOPPLER system is activated and the value 15 V' is used as initial $\Delta X$ value in the integrating process mentioned above. The separation distance $\Delta X_j$ at integration step j is then: $\Delta X_j = \Delta X_i - (V'_j - V''_j)\delta\tau$ (tm) (6)

where subscript i again refers to values corresponding to the previous integration step as is well known in the art. Instantaneous values of Xo can be obtained from equation (4) again. Then the difference $\Delta X_j - Xo$ determines whether the relative position of the two cars has improved or worsened after each time step $\delta\tau$.

In both modes of sensing and of computation described above, as earlier mentioned, a' and a" are unknown at the start of the data processing. An initial value of a' is assumed as indicated by the driver-dialed value or as imposed by default. For lack of better information at this juncture, an identical same value may also be assumed initially for a". However, after the second step differentiation, or integration as may be the case, the values of both a' and a" are calculated for use in equation (4). The values of a' and a" are obtained by using equations (7) and (8) below:

$$a'_j = (V'_j - V'_i)/\delta\tau \quad (7),$$

and $$a''_j = (V''_j - V''_i)/\delta\tau \quad (8).$$

In such circumstances, all the terms of equations (4) are known, and the initial values assumed for a' and a" become unimportant.

Readers familiar with the art will understand that the value of $\delta\tau$ must be small enough so as to yield a satisfactory accuracy in the results obtained from either the differentiation or the integration process. The duration of the calculation steps should also correspond to the frequency at which distance or speed sensing cycles are performed. Most likely, if continuous computations are carried out, the value of $\delta\tau$ will be dictated by the frequency at which the sensing devices operate most effectively.

It is worth referencing at this juncture another US Patent Application made by the present inventor regarding an Automobile Deceleration Sensor and Indicator (Ser. No. 000,519 filed 01/05/'87, now abandoned). If such a system is mounted on car 30, the value of a' will then be readily available, thus requiring no calculation, except for the initial value which still needs dialing in. It should also be pointed out that calculating a' and a" will yield in most instances values of Xo which are conservative, i.e. larger than they would be if higher values of a' and a" were used. The same reasoning would apply to a case where a' is measured directly. Another point worth noting is that car 30 may in some instances slow down faster than anticipated by drivers following car 30, who may be following car 30 and/or one another too closely, as result of the use of the proximity indicator of the present invention. This of course will not protect car 30. To further help in reducing the major cause of multiple-car pile-ups, it seems evident that both a Proximity Sensing and Warning System and an Automobile Deceleration Sensor and Indicator would most advantageously be used in a concurrent manner, as they complement each other by eliminating two basic complementary causes of car pile-ups on highways and especially freeways, i.e. lack of adequate warning on what lies ahead and of adequate warning as to what preventive action is being taken.

The Flow Charts presented in FIG. 14 and 15 illustrate graphically how the data processing of the sensing signals and of the information carried thereby is performed by means of the various equations (Equ.) derived earlier. The nature of the parameters pertaining to all signals lines is identified using the designations indicated hereinabove. C indicates a clock and a time interval (or step) generator. Y/N indicates a switching function that operates according to the sign of $(\Delta X - Xo)$ as previously stated. If it is positive (N), no signal $\sigma$ is generated, whereas if it is negative (Y), an energizing signal $\sigma$ is generated so as to activate either one of the warning devices mentioned earlier.

The subscripts i of the signals entering "Memory" are the same as those of the signals leaving "Memory" because these parameter values calculated during step computations of the ith cycle preceding current computation cycle j are only stored there for retrieval after time step $\delta\tau$. In FIG. 14, the $\delta\tau$ signal line connecting C and Equ.(7)&(8) is interrupted for graphic convenience as indicated by the two corresponding letters m. Signal V' is generated by car 30 speedometer which is not shown.

A flow chart similar to that of FIG. 14 could be used to represent the data processing applicable to a distance-measuring system in which time period $\Delta\tau$ needed by an acoustic wave to travel to-and-back from a sound-reflecting obstacle is measured. This approach represents an alternate method to that of using sonic speed in air instead of the DOPPLER effect shown in FIG. 3. The wind velocity W' or W" is quasi-immaterial in such case as its influence is almost cancelled due to the opposite directions of the incident and reflected waves. Sound speed in air varies as the square root of the absolute temperature. The slight influence of humidity can be neglected. Thus, with that small correction function of temperature, the sound speed may expressed as $Vs = K.T^{1/2}$ and the separation distance is then: $\Delta X = (K.T^{1/2}.\Delta\tau)/2$ (9).

The flow chart addition to FIG. 14 needed for depicting the calculation of $\Delta X_j$ during computation step j is shown in dotted lines. The time period $\Delta\tau$ elapsed between the sending of a sonic signal and the reception of its reflection by car 31 is measured by clock C. The air temperature T is continuously sensed. The separation distance $\Delta X_j$ computed from Equ. (9) is then used instead of the value $\Delta X_j$ directly measured otherwise, as was previously discussed. From point 0 onward (from left to right), the remnant of FIG. 14 flow chart shown in solid lines still applies.

SENSING METHOD DISCUSSION

A discussion of each one of the methods used herein for sensing either distance or velocity is now in order. Their respective advantages and disadvantages should also be reviewed in the context of the proposed application. The various methods already described are summarized in Table A below for ease of identification. Other detection and sensing approaches not mentioned could be used for measuring distance and/or velocity. However, the signal received by the system will still be processed and utilized in a manner similar to that described and discussed above. Table A list of sensing methods should be construed as neither exclusive nor limitative.

reduced so as to render a signal representative thereof easily tractable to electronic manipulation. This is accomplished by means of CCD's (chargecoupled devices) that are electronic devices with very high surface density and can cause a package of electric charge to be transferred from one position to the next every clock cycle.

CCD's used in optical applications have such properties, but in addition also have arrays of photosensitive sensors at each CCD position so as to determine the amount of charge to be transferred. The charges are transferred from one position to the next until they eventually reach the output terminal. The electrical output of the device is therefore a video signal. In TV camera applications, the array of photosensitive sensors

TABLE A

| | Sensing Method Classification | | | |
|---|---|---|---|---|
| | PRINCIPLE USED | DEVICE CONFIGURATION | ADVANTAGES | DRAWBACKS |
| 1. | Distance measuring by triangulation | Range Finder type | Well known | None of a generic nature |
| a. | Optical image superimposition | Split-light-beams reunited | Simple and direct | Need of visible object |
| b. | Delay of electronic signal | Split-light-beams arrival time sensing and measure | Complex but state-of-the art in cameras | Object detection may be difficult |
| c. | Direct angle measurement | Sensing of angle of incidence | Simple but questionable | Least known |
| 2. | Distance measuring by wave propagation time | Use of wave source and reflected wave sensor | Easy to aim in a sweeping manner | Large influence of object shape |
| a. | Wave nature: ultra-sounds (Sonar) | Use of sound emitter and receptor (pulsing) | State-of the art technology | Large attenuation of reflected wave |
| b. | Wave nature: electro magnetic waves (EM, Radar) | Use of EM wave generator and receptor (pulsing) | State-of-the art technology | Questionable for short distances |
| 3. | Velocity measuring by means of frequency shift (DOPPLER) | Use of ultra sound generator and receptor | State-of-the art technology | Influence of wind on measurements |

Note:
requires integration to compute distance

Table A information reflects the state-of-the-art of distance and/or velocity measuring in a very general way. One aspect specific to the present application pertains to the discrimination, identification and/or detection of obstacles that may assume many different shapes and/or sizes. Another aspect of the application pertain to the range of distances which must be covered by the system, e.g. from about 100 ft down to 1 ft. Further, the system is most useful and needed when car driving conditions are at their worst, e.g. fog, heavy rain, heavy traffic, dusk or drawn. Considerations of cost and dependability are also important. The addition of another safety system must not become the cause of new sources of car malfunctions and/or accidents. The sensing methods above are now examined and discussed in that light.

OPTICAL IMAGE SUPERPOSITION EMBODIMENT

The superpositioning (or superimposing) of two optical images requires a light-sensitive device that can detect the superposition of two identical images or the lack of it. In direct viewing range finders (FIG. 4), the operator's eye is the sensing device and the fingers are mirror 48 actuating means. In the present application, the human eye and its power of discrimination must be replaced by electronic means that can perform the same function. The complexity of the image can be greatly must cover the entire picture area. They are raster-scanned at TV cycle rates. For the purpose of distance measurement, a single line of photosensitive sensors suffices. The output is thus one single horizontal line as compared to an entire TV screen.

When such a signal is displayed on an oscilloscope tube, the image is a waveform similar to that exhibited in FIG. 5 screen 58. Typically, the waveforms generated by the left and right CCD's are identical except for parallax off-setting that results in a horizontal translational relative displacement between the two waveforms. The extent of such displacement in function of the values of angles A and B. Electronic circuits are used to determine how much the left or right signal must be translated to bring both of them to coincide, i.e. providing thereby the equivalent of visual superposition of imagery earlier mentioned.

If the principle of range finding illustrated in FIG. 4 is applied, mirror 48 may then be positioned in front of CCD 55 so as to cause such superposition to occur. The amount of rotation needed by the mirror yields the value of angle B, thus by means of triangulation, the distance separating the range finding device from viewed object 31'. The electric and electronic circuits utilized to cause the mirror rotation in response to the amount of rotation of mirror 48 are well known in the art and need no further discussion. The amount of rotation is sensed and electronically processed to provide a signal indicative of the separation distance $\Delta X$ previously identified. Time Delay Measuring Embodiment:

The image sensing and reduction process used here by means of CCD's is the same as that discussed above. However, no attempt is made to superimpose the two waveforms. The amount of offset $\lambda$ is used to determine electronically the time lag between the arrival times to CCD 54 and CCD 55 of the same identifying waveform. This time delay is then processed by electronic means well known in the art to calculate $\Delta X$.

ANGULAR MEASUREMENT EMBODIMENT

This embodiment is schematically depicted in FIG. 6 drawing. A light source located on or near the range-/finding device emits a light ray that strikes surface 31' at point P". This light ray is reflected back to the range finder and is sensed by a light detector positioned at a preset distance from the light source. The light detector is a CCD and is capable to sense the incident angle at which the reflected light beam hits its photosensitive surface. The output signal of sensor 64 is thus indicative of the value of angle B. By means of triangulation, distance 0"—P" can then be calculated by means again well known in the art. Some lowcost auto-focusing cameras use this type of distance-measuring devices. In such cameras, the light is typically infra-red. Distance-Measuring Embodiment Using Sound-Waves:

This embodiment uses a well-known means for measuring distances, utilizing the speed of sound and the travel time thereof as yardstick. The diagram of FIG. 3 may be used to illustrate this principle. An acoustic wave source located at point M on surface 30' emits sound beam 98. When the latter strikes surface 31', it is reflected as another beam 99 of much lower intensity, though strong enough to be detected by a sound pick-up receiver located at point N, next to point M. Neglecting the influence of angles, the sum of the lengths of beams 98 and 99 represents 2 $\Delta X$. The speed of sound in air varies with temperature and the degree of humidity. The latter influence is negligible and can be ignored. As applied to cameras for auto-focusing purpose by Polaroid, the influence of temperature can also be ignored. But in the case of the present application, the difference in sound speeds between a very hot day and a very cold day is far from negligible, typically up to 15%. However, such temperature correction at a given altitude is straightforward. A temperature sensor emits a signal indicative of the atmospheric temperature. An electric signal varying as the square root thereof is generated for use in the data processing earlier described and discussed.

In this instance, the wind velocity W' or W" is not very influential and can be ignored as it almost cancels out because of the reverse directions followed by the incident and reflected beams. The speed of sound is only one order of magnitude larger than the higher car velocities of interest, i.e. 60-65 mph or approximately 100 ft/sec. The critical separation distance for such velocities is slightly higher than 50 ft (graph of FIG. 2). Thus a sound signal will take about 0.1 sec to travel from M to N by way of R. Such an appreciable and valuable time cannot and should not be lost, for it contributes to reducing the quickness of the obstacle-proximity information. However, short bursts of ultrasonic beeps lasting 0.01 sec can be emitted every 0.025 sec for instance. Each beeping burst could be at a different frequency, e.g. four different frequencies: 14,000, 16,000, 18,000 and 20,000 cps for example. The minimum time period elapsed between the emission and reception of two consecutive beeps of identical frequency is then accepted by the system as meaningful and used. With such provisions, the sluggishness drawback inherent to this embodiment can easily be overcome.

As was earlier discussed, the distance $\Delta X$ separating cars 30 and 31 can be calculated for comparison with the value Xo indicative of the degree of proximity below which the two cars should not find themselves. Equation (9) is used to that effect. Sound has the advantage of being weather and time-of-day insensitive.

DISTANCE-MEASURING EMBODIMENT USING RADAR

RADAR (RAdio Detecting And Ranging) is commonly used by police forces for measuring car velocities. A short pulse of electromagnetic radiation is sent out by means of an antenna. This pulse strikes the obstacle and is reflected back to the range finding device. Similarly to the SONAR system discussed above, such a radar system measures the time taken by the round trip of the wave from the source back to a receiver located next to the source. A distance $\Delta X$ travelled can then be calculated using the constant speed of light, independent of wind, weather conditions and temperature. However, the large value of the speed of light means that, for the distances of interest here, very small time periods must be measured. The compatibility limitations of this system and of the present application need now be discussed.

First, if considerations of costs and size are ignored, radar possibilities extend from larger distances down to approximately one foot. Thus, the distance range (between one hundred and a few feet) required here can easily be accommodated. Frequencies in the range of several GHz must be used so as to make the EM wave length smaller than the minimum separation distance to be measured. Second, the pulse needs consist of only the first half of a wave. The time interval between the rise of the front of the waveform being sent and of the front of the waveform being received is measured at points corresponding to a given percentage of the total amplitudes of each one of the two waves. The measured time period separating these two events can then be used in Equ. (9) to calculate $\Delta X_j$.

The degree of focusing of a radar beam depends on the diameter-equivalent of the antenna. Because of the size limitations imposed in the present application, beam-intensity distribution cannot be narrow. Scanning or sweeping through solid angle $\pi'$ is not needed. However, the intensity of the reflected beam is consequently that much more attenuated, requiring a larger degree of amplification. Again, such system is weather insensitive and operates equally well day and night.

DOPPLER SENSOR EMBODIMENT FOR VELOCITY MEASUREMENT

Both EM and sound waves can be used as frequency carriers to measure the frequency shift that results from the relative velocities of a moving source and of a fixed observer. For the present application, ultra-sound waves appear to be the most suitable type of frequency carrier. In FIG. 3, arrow f direction is assumed positive and with the symbols given therein, the ratio of the two frequencies f (source frequency) and f' (frequency sensed by the observer) is $f'/f = (S + W'' - V'')/(S + W'' - V')$. The observer becomes another source in the present application, as the incident sound beam becomes reflected by such observer. The original source then becomes in turn another observer. Under such conditions, the frequency f'' senses by a receiver mounted next to the source is then, S being the speed of sound:

$$f''/f = [(S-W''-V'')/(S-W''-V')]/[(S+W''+V')/(S+W''+V')] \quad (10)$$

Equation (10) indicates that the wind velocity could appreciably affect the amount of frequency shift sensed, for high wind speeds especially at low car velocities. However, it can be argued that steady wind velocities greater than 30 mph are not that common and that the proximity sensing system is most useful when car velocities exceed 40 mph.

PROBING SIGNAL FOCUSSING

Attempts to focus the probing signal msut be made for several reasons: (1) to minimize the amount of power required to generate that signal, (2) to minimize the amount of "noise" or loss of probing signal directed outside solid angle $\tau'$, (3) to maximize the intensity of the amount of signal reflected back, (4) to maximize the degree of obstacle discrimination, and (5) thus to minimize the degree of amplification and/or sophistication of the signal receiving system. Three types of signal carriers have been mentioned: (1) light waves, (2) EM waves, and (3) acoustic waves. Neither one of these wave types must interfere with the surrounding environment. Thus, light can be infrared and is capable of a very high degree of focussing, e.g. CO2 laser beams. Radar beams can also be well focused in a non-interfering frequency range, but to a lesser degree. Sound must be inaudible, but even in a high frequency range, e.g. 20 to 100 KHz, is the least amenable to focussing. Means for focusing either one of these three wave types are well known by those skilled in the art and need no elaboration. However, they share a one common trait: the shorter the wave length, hence the higher the frequency, the easier the task of focussing the beam. Scanning through angle $\tau'$ by means of a highly focussed probing signal beam (FIG. 10, angle $\gamma$) is most applicable to the use of an infrared laser, but not applicable to the use of acoustic wave beam for which scanning appears least attractive anyway.

Thus, well known ways of focusing acoustic and EM waves can be used with cost and space saving in mind. Focusing of light beams is discussed in conjunction with the use of scanning as depicted in FIG. 10-13. Either laser or light beams emerge from a source located behind FIG. -13 point 0. Both pass through a lens or are reflected from a parabolic mirror so as to create signal beam 86 (angle $\gamma$). The light source is fixed, but the lens center or the mirror focus point are positioned at point 0. Beam 86 oscillating motions about axes OX and OY thus result only from the lens (or mirror) oscillating motions about point 0, and the same axes. It appears simpler and mechanically more convenient to cause only one mechanical part to move freely, but for the restraints imposed by torsion springs 92 and 93. The amplitudes of the exciting vibrations along axis 0Z are small compared to the latitude available for the exact position of point 0, and their pulsating effects on focussing may be ignored. The light source may also be enabled to vibrate but not to oscillate, if need be.

NOISE DISCRIMINATION AND OBSTACLE RECOGNITION

A cursory examination of FIG. 1 and 7 diagrams reveals two obvious problems inherent to the system operational conditions: the accommodation of changes in profile of the highway (angle $\tau'$) and the elimination of signals either emitted by oncoming cars also similarly equipped or reflected from oncoming cars and objects standing on the road side. It would be impractical costwise to consider systems that provide these three features: (1) scanning by the emitted beam, (2) coordinated and synchronous scanning by the reflected signal receiver, and (3) full discrimination between reflected signals and identification of the obstacle nature. Thus, a simple practical compromise must be provided. First, recognition of incoming cars and obstacles at rest can be handled very simply by means of data processing logic loops.

To that effect, reflected signals that conveys velocity data yielding instantaneous values of (V'—V'') larger than that of V' indicate that the obstacle is moving toward car 30 in an opposite direction. Such signal can be ignored, because the system is neither designed for nor useful in cases of head-on collisions. This condition is diagrammatically illustrated in FIG. 15 flow chart by the logic loop shown in dotted lines and leading to the V''$_f$-TEST block. In addition, such condition can apply also to signals that are not reflected but emitted by an oncoming car also equipped with the same system. Furthermore, the system can be adjusted to start operating only when V'>15 mph for instance, the V' signal provided by speedometers being inaccurate for lower velocity readings. Obstacles standing on the road side such as signs and/or trees/bushes have no velocity. Again, all signals corresponding to calculated values of V'' lower than 10 mph can also be ignored. It can be argued that such operational restrictions do not significantly limit the usefulness of the proximity warning system but eliminate potential causes of errors in the decisionmaking process of the system, which could otherwise have serious consequences.

Another complementary system feature could provide a second level of discrimination based on the signal characteristics. This applied particularly to SONAR and RADAR devices for which a different signal frequency can be set for each car. If a large number of cars are equipped with the same type of system however, even a large number of frequency ranges will not completely eliminate the likelihood that two cars travelling in opposite directions in adjacent lanes might activate each other's sensor. It is believed that the combinational use of the two design features discussed above will reduce the probability of false signals generated by "noise" down to a non-objectionable level.

The case of cars travelling in the same direction but in adjacent lanes is somewhat trickier, i.e. neither one of the two design solutions discussed above applies. That case, though, presents a similarity with that of changes in road profile (or orientation/configuration). Hence, it may be discussed in that context, for accommodating for such changes is both mandatory and tractable by design. The two cases of turning road and on-going cars moving straight in an adjacent lane is illustrated in FIG. 1 by car 33 moving with a velocity v* (dotted line) of direction opposite to that of V* on the other side of straight line divider 32 and by curve 101 (dash-dot line) representing the curvature of the road. If signal emitter 76 is fixedly mounted on car 30, angle α axis (arrow-f direction ) always remains aligned with car 30 centerline. The outgoing signal beam will then reach car 35, which it must in a road curve, and car 33 with velocity v* if it relatively moves one car-length forward in FIG. 1 when the road is straight, which it should not. There lies the problem of discriminating between a car such as 33 (referred to as 33′) and a car such as 35.

Again a logic side loop may be used to that effect in the data processing. It is assumed that, more likely than not, car 33′ moving at velocity v* earlier passed car 30 and that the distance separating this car 33′ from car 30 augments while v* remains larger than V′. Thus, if V″ (v* here) is larger than V′ when distance ΔX is first calculated at the signal onset, and ΔX is much smaller than Xo at the beginning of such occurrence, the signal is of a spurious nature and must be ignored. In FIG. 15 flow chart, such logic loop is also depicted in dotted line connecting block V‴/ΔX-TEST to the block representing equation (6). Programming the logic and use thereof of such value-testing loop is state-of-the-art and is well known. The basic assumption made above is applicable only when car 33′ travels faster than car 30.

Another practical instance occurs when car 30 travels faster than car 33′ (V′>v*) occupying location 35 and sets about to pass car 33′ when the road curves, as shown by line 101. The proximity warning system of car 30 does not know whether the reflected signal is sent by a car such as 35 (in the same lane) or a car such as 33′ (in another lane). This dilemma cannot be resolved simply and no general automatic solution is offered.

At this juncture, if a proximity warning system is to be kept simple, its designer has to determine a compromise based on realistic limits that can be imposed on the system performance, without hampering it too much. Such limits are: (1) a typical obstacle transversal cross-section width, (2) an average lane width, (3) a critical distance X′o below which an adjunct emergency system will not be activated, and (4) a minimum radius of curvature of the lane consistent with and derived from the values adopted for (1) to (3) above. A compromise solution can then by obtained by solving a simple geometric problem, as just defined above. Situations will occur where a warning signal would still be generated when a wide truck or bus in an adjacent lane is about to be passed by car 30. Car 30 driver is of course aware of such occurrence and can either ignore the warning signal resulting therefrom or switch the system off momentarily.

Another system design feature will also alleviate some of the effects of road curves on the system performance. Both emitter 76 and receiver 78 can be made orientable in response to the steering wheel rotation in car 30. This will ease the problem in the majority of long curve cases such as those present in off- and on-ramp accesses to freeways. Also, the positioning of both emitter and receiver is important, especially in the case of hilltop or bottom locations. This is illustrated in FIG. 7 where another position 0′ is shown for position 0 earlier defined by the convergence point of lines 73 and 74. It is obvious that angle provides an enhanced viewing of car 31 or even of cars located further ahead.

SWEEPING AND SCANNING BY PROBING BEAM

The discussion above also serves to point out that angle τ′ should be as large as possible so that probing beam 77 may cover road topography changes adequately, but that this augments the likelihood of spurious and unwanted signals being generated. The beam sweep or scan described in FIG. 10–13 is intended to provide the possibility of enhanced beam intensity with enlarged beam angular coverage. Means for adjusting both angular coverages of such sweep, vertically and horizontally, are described in the previous section. The driver may be given control of such adjusting means so that he or she is enabled to adapt solid sweep angle τ′ to the circumstances, i.e. traffic conditions and/or road topography. Also, such sweeping action by an intensity-enhanced beam appears better suited to specific types of beams. This is discussed first below.

Focussed and intensity-enhanced beams are particularly suitable to systems in which the probing signal carrier is a radiation such as light, laser output being the extreme case. They are least effective for and thus less suitable to systems in which sonic or radio-type waves are used. Thus, this feature is discussed in the context of its application to a laser beam that represents the ultimate in focusing. In Table A, the sensing methods that benefit from the use of such feature are 1.a, 1.b and 1.c. Each one of these three methods relies on an image of the obstacle being available for sensing. This may not always be the case, e.g. car 31 having no tail lights on a dark night. Thus it seems that the obstacle cannot be relied on always providing an adequate light source, i.e. it should be "illuminated". A visible light beam would be disturbing, enhancement of natural infra-red radiations may either be too costly or inadequate. A well-lit and outlined spot will be easier to identify, on most kinds of surfaces. Well-lit here refers to lit by infra-red rays. Furthermore, at the light source, the beam may be reflected from a low-mass mirror that can be mechanically vibrated at high easily-adjustable frequencies, whilst the light source itself remains still. Discrimination between the spot image and any luminous "noise" is then facilitated on two counts: (1) the spot light instantaneous intensity is much higher than that of any other background light spots (i.e. tail lights, headlights, hot tailpipes, brake lights, etc...) and its frequency is unique, and (2) the spot image moves sideways and/or longitudinally (case of two obstacles separated by an appreciable distance being included in the same sweep coverage) at a velocity much larger than that of any noise source.

The signal receiving device does not mechanically scan throughout solid angle τ, but covers it all. The repetition of the formation of the light spot image on the CCD sensitive surface at a frequency higher than that of the sweep is an indication of the existence of an obstacle ahead of car 30. When this happens, the sweep coverage can be reduced so as to decrease angle τ′ and/or reorient the receiver if the latter can be directively adjusted. Timing and time durations of the signals need now be better defined. From results previously presented (FIG. 2) it can be assumed that an amount of time of the order of 0.1 sec can safely be allocated between two consecutive appearances of the spot image on the CCD sensitive surface. To be conservatively safe, from the proportions shown on FIG. 11 between d and W (or h), one may assume that the whole sweep could be at a rate ten times faster than the time delay of 0.1 sec just mentioned. Thus mirror vibration frequencies of 100–200 cps will be more than adequate. Within that number range (100 to 200) there are enough prime numbers to choose from that will insure that the sweeping of area S by spot 95 of FIG. 11 takes place as described in the previous section.

Handling of Hazardous Weather Conditions:

Particularly hazardous driving conditions exist when either fog or heavy rain occurs. Light as signal carrier may not be effective enough. Radar or ultra-sounds appear to be capable of higher performance under such conditions as signal carriers. In either of these two cases, beam sweeping appears neither possible nor necessary. Also, it is well known that fog greatly contributes to causing car pile-ups on freeways because of the reduction in visibility that it creates, especially of the traffic conditions beyond the first car ahead. Rain also reduces visibility, but has additional effects: that of making the pavement slippery and that of facilitating hydroplaning effects between tires and pavement. Thus the system of the present invention appears to be most needed and most useful when the surrounding conditions make it most difficult to operate efficiently.

Heavy fog and rain both muffle sound and attenuate its intensity during its propagation through such media. However, it is believed that provisions can be made in the capability of both the ultra-sound emitter (i.e. volume) and receiver (i.e. sensitivity) to compensate for such adverse effects. Electromagnetic waves at some frequencies should not be affected to any critical degree. It is believed that they are least sensitive to such adverse weather conditions. RADAR offers a distinct advantage in this regard.

AUTOMATIC EMERGENCY ASSISTANCE

Assistance to the driver herein means the automatic and involuntary substitution of a car control system for the driven control which is normally exerted on the car. This should and must happen only when a driving emergency is deemed to have developed whereby a collision seems inevitable unless immediate action is taken. Under standard driving conditions, the driver normally causes the engine to revert to idling and brusquely applies the brakes when an emergency situation seems imminent. Depending upon the degree of the element of surprise involved, the driver will often by reflex action apply the brakes as hard as is possible. That may also have disastrous results, because the surprise element propagates backward from driver to driver behind the car in questions (car 31 to the present disclosure).

Thus for safety reasons, the two emergency actions to be taken by the system should practically be programmed to happen sequentially and with different time delays, the first one having less chance of causing dire consequences. The rate of fuel supply to the engine should first be brought to the engine idling setting, then soon thereafter emergency braking could take place. The various time delays could be as follows, from the time an emergency situation is deemed to be in force: (1) pre-warning signals are initiated (sound and light) inside the car, (2) an emergency condition is deemed to exist and both sound and light warnings are heightened (t=0), (3) after 0.1 to 0.2 sec the fuel supply rate is cut down to idling setting (t=0.1 to 0.2 sec), and (4) 0.2 to 0.3 sec thereafter, the emergency brakes are applied automatically unless the driver already has fully applied the brakes (t=0.3 to 0.5 sec). The driver should be given the opportunity to adjust these time delays to his (her) temperament, and which covers ranges of fast to slow reflexes.

The fuel supply rate can be adjusted down to engine idling setting my means of an adjustable-length linkage located between the gas pedal and the fuel metering device. Such a variable and adjustable length linkage is described in my U.S. patent application Ser. No. 929,096 filed 11/10/'86 and entitled Variable Speed Power-Transmitting System (U.S. Pat. No. 4,747,269 dated 5/31/'88). The driver feels the reaction of the car to the fuel delivery rate reduction and is given time to get prepared for the jolt that results from the soon-to-come emergency brake application. The time delays mentioned above are of course added to the period of time during which warning signals were already activated, but not at an emergency "volume" level. The emergency brake may consist of an hydraulic cylinder/-piston arrangement mounted in parallel with a standard brake system or of a variable-length linkage located between the brake pedal and the brake master cylinder. The second alternative seems preferable, for it does not interfere with the working and the installation of the brake hydraulic system. The operation of such an emergency braking system will be improved whenever the car so equipped is also equipped with an anti-skid brake control system.

INVENTION EMBODIMENT GENERIC BLOCK DIAGRAM

The basic elements and functional components of a generic embodiment of the present invention are illustrated in FIG. 16. The various signal lines connected these basic system components are identified for ease of recognition. Alternate or additional features and/or components, and connecting lines thereof, are illustrated in dotted lines for ease of identification. In the most general and basic case, signal emitter 76 sends signal 78 which may be caused to directionally oscillate by means of beam vibrating device 110 (see FIG. 13). The drive frequency of the system may be adjusted by means of frequency control 111 in response to a signal from the CPU that receives command signal 113 in response to road configuration variations and/or driver input, so as to adjust the size of the area S covered by the sweeping action of beam 86. The car instantaneous velocity V' signal is generated by car 30 speedometer and inputed upon proper processing in the CPU.

Output signals S1, S2 and S3 are sent to the warning systems, i.e. the sound and light signals, the fuel delivery rate cut down signal and the emergency braking signal. The time delays mentioned earlier are determined and generated by the CPU. The driver is enabled to input various operating data such as: ON/OFF command, car conditions (114) and/or traffic conditions (115). In a most general case, emitter activating and regulating system 116 is used to provide energy and control assistance to emitter 76, the former receiving its command from the CPU through signal line 117 and being connected to the emitter by signal line 118. Reflected-signal receiver 78 transmit its input through signal line 119 to signal booster- and/or transducing system 120. The latter may then generate two processed signals 121 and 122, i.e. one for frequency and the other for intensity in the case of dual sensing.

The fuel delivery-rate cut-down device 124 and the emergency brake actuating system 125 are depicted by blocks shown in dotted lines. These could be considered as alternate or additional features that complement the basic invention embodiment. The driver should have the possibility of switching off the operation of such components simultaneously and inclusively of each other. However, if an external warning signal such as that which is generated by light 83 (FIG. 8) is present, it should not be switchable when the basic warning system is operative, because the signalling to other drivers is considered most important then.

CONCLUDING REMARKS

In conclusion, the various basic components, features and structures hereinabove described and discussed can be combined and arranged into distinctive alternate embodiments of the present invention. Their functions and the basic warning signals provided thereby are however similar and achieve the same goal: warning both the driver of the car equipped with such system and other drivers in the vicinity of that car that an unsafe driving/traffic condition has developed and thus that extreme caution is required. Before the nature of both the emitted and reflected signals is selected for a warning system, a considerable amount of experimental work and consultation with state and federal transportation and police agencies will be needed. It is certain that vehicle insurance companies should also be involved at early stages of the developmental work. One aspect of most importance is the eventual possibility that the addition and use of such warning systems might initiate and/or create causes of accidents that otherwise would not have materialized.

As is the case when new additional systems/devices are introduced in the operation of an already existing overall system, such causes always manifest themselves. The most difficult to analyze and anticipate are those which result from driver(s) reactions to the warning signals. Also, it is imperative that any failure of the warning system and/or any of its components does not in turn become the cause of either false warning signals or failures of some other vital car components to operate satisfactorily. However, the potential which such warning system has in terms of life saving and car damage prevention should justify an extensive development program. Only thereafter, can an effective and optimized embodiment of the proximity warning system of the present invention emerge.

Therefore, it is thought that the various components and combinations thereof in the form of various preferred embodiments of the present invention and many of its attendant advantages will be understood from the foregoing description and it will be apparent that various changes may be made in the form, construction and arrangement of the parts thereof without departing from the spirit and scope of the invention or sacrificing any and all of its material advantages, the form hereinbefore described being merely preferred or examplary embodiments thereof.

Having thus described my invention, I now claim:

1. A system for detecting the presence of an obstacle located on the path of a motorized vehicle equipped with such system and for warning the driver of the vehicle that danger of a collision with the obstacle exists, said system comprising:
   means for emitting and directing a probing electromagnetic radiation beam ahead of the vehicle;
   means for receiving and recording a portion of said beam when reflected off the obstacle, as a reflected signal;
   means for analyzing and processing the reflected signal by comparison with the probing radiation beam;
   means for determining therefrom the separation distance and the differential velocity between the vehicle and the obstacle;
   warning means for indicating the unsafe presence of the obstacle in the vehicle path;
   means for focusing said radiation beam in a small solid angle;
   means for directing said radiation beam within a specified solid angle having its axis substantially parallel to the vehicle axis and being larger than the focused beam solid angle;
   means for causing the beam emitting and focusing means to oscillate about two orthogonal directions located in a plane substantially perpendicular to the beam direction; and
   means for adjusting and varying the frequencies of these two oscillations so that they remain out of phase and without harmonics for enabling a point on the beam axis to follow quasi-Lissajous Curve patterns that provide a gradual and continuous coordinated motion of said point along the two oscillation directions, thereby enabling the area thus swept in a scanning fashion by the beam to cover a wide area with a narrow beam of enhanced radiation intensity;
   whereby the impact area of the beam on the obstacle provides an enhanced reflection of the beam off the obstacle.

2. The system according to claim 1 wherein the amplitudes of the two oscillations are adjustable, said system further comprising:
   means for vibrating a structure, on which the beam emitting means is mounted, in substantially the beam direction;
   a combination of spring means and inertial means for causing said vibrations to generate resonance conditions of the beam emitting means about its two axes of oscillation simultaneously; and
   means for varying and adjusting the structure vibration frequency so as to vary both resonance conditions concurrently;
   whereby the amplitudes of both oscillations vary accordingly and can be adjusted simultaneously.

3. A method of warning the driver of a vehicle equipped with a system for detecting the presence of an obstacle located on the path of a motorized vehicle that a potential collision condition has developed and which must be corrected, said system comprising means for sending and directing probing signals ahead of said vehicle, means for receiving and processing reflections thereof by the obstacle, means for determining from comparison between the emitted signal and the reflected signal the distance separating the vehicle from the obstacle, means for determining the temporal variations of relative velocity of the vehicle with respect to the obstacle, means for determining the actual instantaneous distance separating the vehicle from the obstacle, means for establishing a safety criterion based on a vehicle/obstacle separation distance and the relative velocity thereof, means for warning the driver when the collision condition has developed, means for activating an emergency operation of the vehicle brakes and means for concurrently cutting the delivery rate of the fuel supply to the vehicle engine down to engine idle speed setting, said method comprising the steps of:
   measuring the vehicle instantaneous velocity;
   computing the instantaneous velocity of the obstacle;

computing the difference between said two velocities;

computing the actual distance separating both vehicle and obstacle at set time intervals;

computing a value of the safe separation distance criterion at the end of each one of said time intervals;

comparing the actual distance between vehicle and obstacle to the criterion value previously just calculated;

generating a warning signal whenever said actual distance becomes smaller than the calculated safe criterion value;

causing the driver to become unequivocally alerted of the existence of a potential collision danger;

generating signals for activating the emergency brake operation and the fuel delivery rate cut-down within a short time after the warning signal has been initiated;

enabling said signals to activate the brake operation and fuel cut-down if no corrective action is taken by the driver during said short time; and cancelling said signals when corrective actions are taken by the driver during said short time.

4. A method of warning the driver of a vehicle equipped with a system for detecting the presence of an obstacle located on the path of a motorized vehicle that a potential collision condition has developed and which must be corrected, said system comprising means for sending and directing probing signals ahead of said vehicle, means for receiving and processing reflections thereof by the obstacle, means for determining from comparison between the emitted signal and the reflected signal the distance separating the vehicle from the obstacle, means for determining the temporal variations of relative velocity of the vehicle with respect to the obstacle, means for determining the actual instantaneous distance separating the vehicle from the obstacle, means for establishing a safety criterion based on a vehicle/obstacle separation distance and the relative velocity thereof, means for warning the driver when the collision condition has developed, means for preventing the driver from interfering with the system operation after a warning signal has been initiated, said method comprising the steps of:

measuring the vehicle instantaneous velocity;

computing the instantaneous velocity of the obstacle;

computing the difference between said two velocities;

computing the actual distance separating both vehicle and obstacle at set time intervals;

computing a value of the safe separation distance criterion at the end of each one of said time intervals;

comparing the actual distance between vehicle and obstacle to the criterion value previously just calculated;

generating a warning signal whenever said actual distance becomes smaller than the calculated safe criterion value;

causing the driver to become unequivocally alerted of the existence of a potential collision danger;

de-activating an ON/OFF switching means of the system as soon as a warning signal is initiated; and re-activating said ON/OFF switching means when the collision danger has ceased to exist.

* * * * *